United States Patent Office — 3,209,008 — Patented Sept. 28, 1965

1

3,209,008
PREPARATION OF AROMATIC GLYOXYLONITRILE OXIMES

Edward J. Poziomek, Edgewood, Md., and Arthur R. Melvin, Melrose, Mass., assignors to the United States of America as represented by the Secretary of the Army No Drawing. Filed Feb. 8, 1963, Ser. No. 257,822
5 Claims. (Cl. 260—294.9)
(Granted under Title 35, U.S. Code (1952), sec. 266)

The invention described herein may be manufactured and used by or for the Government of the United States of America for governmental purposes without the payment to us of any royalty thereon.

This invention relates to a new process for the preparation of aromatic acetonitrile oximes. Stated in another way, this invention prepares aromatic glyoxylonitrile oximes in which there is substituted an aryl or heterocyclic nucleus.

In this invention disclosure, we use the term aromatic in its broadest sense which means the term is generic to carbocyclic and heterocyclic rings which have aromatic properties such as pyridine, benzene, furan, quinoline, benzothiazole, etc., rings.

In contrast to the patent to Reilly 2,749,358 and the article by Frost, Ann. 250:163 (1889) which show the nitrosation of cyano compounds which have an activated methylene group, our process involves the cyanization of aldoximes.

An object of our invention is a process which prepares heterocyclic and aromatic acetonitrile oximes from aldoximes which are commercially available. A further object of our invention is to avoid the use of the isonitrosation reaction since with certain heterocyclic systems the starting materials are not commercially available nor easily prepared. A still further object of our invention is a process which can be performed in essentially one step without isolation of the intermediates and which does not have any critical reaction conditions.

The above objects are achieved in our invention by reacting gaseous chlorine with a solution of the aromatic or heteorcyclic aldoxime in an inert oxygenated organic solvent at a temperature in the range 0–15° C. for 10–20 minutes. The solution is then heated to a temperature of 40–80° C. for 1–1½ hours with 1–2 moles excess cyanide ion and the product is separated by cooling and filtration. The cyanide ion is provided by the addition of an alkali metal such as potassium or sodium cyanide dissolved in the same solvent.

Solvents that can be used are liquid lower alkanols, lower alkylethers, and lower alkanones. Non-limiting examples of these solvents are ethanol, methanol, dipropyl ether, diethyl ether, acetone, and diethyl ketone. For the purposes of this invention, we consider these solvents to be inert oxygenated organic solvents.

Our reaction can be applied to various aldoximes such as:

Phenyl aldoxime (benzaldoxime)
2-pyridyl aldoxime (picolinaldehyde oxime)
4-pyridyl aldoxime (isonicotinaldehyde oxime)
2-benzothiazole aldoxime (benzothiazole 2-carboxaldoxime)
p-Dimethylaminophenyl aldoxime (p-dimethylaminobenzaldoxime)
2-quinoline aldoxime (2-quinolinecarboxaldoxime)
4-quinoline aldoxime (4-quinolinecarboxaldoxime)
p-chlorophenyl aldoxime (p-chlorobenzaldoxime)
6-methyl-2-pyridyl aldoxime (6-methylpicolinaldehyde oxime)
Furan aldoxime (furfuraldoxime)
Thiophene aldoxime

2

Our reaction can be applied to any ring substituted aldoxime provided there is a double bond in said ring adjacent the α carbon atom to activate the α hydrogen atom attached thereto. Our reaction is not applicable to aliphatic aldoximes due to side reactions, i.e., chlorination on carbon atoms other than the α carbon atom.

The compounds prepared by our process are useful intermediates to make colorimetric detector chemicals and other final products as is set forth by Reilly in U.S. Patent 2,749,358 and Beilstein, vol. 10, 2nd supplement, page 457.

The reaction appears to follow the following sequence which is shown for the preparation of 4-pyridineglyoxylonitrile oxime (VI) from 4-pyridyl aldoxime (I) but may be taken as being typical for the preparation of any aromatic or heterocyclic oximino acetonitrile:

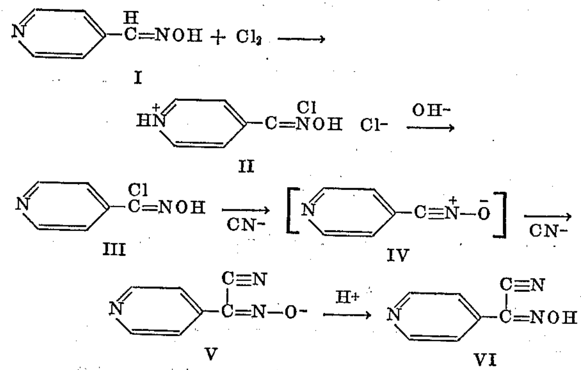

EXAMPLE I

*4-pyridineglyoxylonitrile oxime*

Chlorine gas was passed into a methanolic solution of isonicotinaldehyde oxime (I) (30 g., 0.25 mole) at 5–10° C. for 15 minutes. A precipitate was formed within 5 minutes. The chlorinated product (II) was filtered, then was added to methanolic solution of potassium cyanide (51 gms., 0.80 mole) with vigorous stirring. The later reactions and subsequent operation were performed in a very efficient hood to protect the operator from exposure to hydrogen cyanide. The mixture was heated at 60° C. for one hour with occasional stirring, cooled, filtered, and the filtrate treated with 10% hydrochloric acid to pH 5. The resulting mixture was filtered and the residue was washed twice with 200 ml. portions each of water to give 20.0 g. (54.4% yield) of a tan solid, M.P. 275–278° C. dec. Its infrared spectrum and melting point were identical to an authentic sample of 4-pyridineglyoxylonitrile oxime prepared by the isonitrosation method.

Calculated for $C_7H_5N_3O$: C, 57.1; H, 3.4; O, 10.9.
Found: C, 57.4; H, 3.7; O, 11.0.

In order to confirm the sequence stated above, the chlorination product (II)—isonicotinohydroxamic chloride hydrochloride was again prepared and found to have an M.P. of 192–193° dec. Upon analysis it was found to have:

C, 37.8; H, 3.1; Cl, 36.0.

This compares favorably with the calculated value for $C_6H_6Cl_2N_2O$ of C, 37.3; H, 3.1; Cl, 36.7.

The presence of another intermediate, isonicotinohydroxamic chloride (III) was confirmed by treating 27 gms. of (II) to an aqueous solution of 5.6 gms. of sodium hydroxide. This mixture was immediately filtered to give 14 gms. of a colorless solid M.P. 155–156°.

Calculated for $C_6H_5ClN_2O \cdot 1\frac{3}{4}H_2O$: C, 38.3; H, 4.5; Cl, 18.4.
Found: C, 38.4; H, 4.2; Cl, 18.4.

A portion of the product was triturated with methanol and the mixture was filtered to give a colorless solid M.P. 139–141.5 dec. whose infrared absorption spectrum corresponded to the higher melting hydrate.

Calculated for $C_6H_5ClN_2O$: C, 46.0; H, 3.2; Cl, 22.6.
Found: C, 45.5; H, 3.3; Cl, 22.1.

Due to the fact that compounds similar to the nitrile oxide (IV) are known to polymerize into furoxanes, no attempt was made to isolate this intermediate.

In similar manner to the above example the following compounds have been prepared:

6-methyl-2-pyridineglyoxylonitrile oxime: M.P. 209–210° C. dec.

Calculated for $C_8H_7N_3O$: C, 59.6; H, 4.4; N, 26.1.
Found: C, 59.2; H, 4.5; N, 25.5.

2-pyridineglyoxylonitrile oxime: M.P. 218–221° C.

Calculated for $C_7H_5N_3O \cdot \frac{1}{2}H_2O$: C, 53.8; H, 3.8; O, 15.4.
Found: C, 53.13; H, 3.8; O, 15.0.

4-quinolineglyoxylonitrile oxime: M.P. 255–257° C.

Calculated for $C_{11}H_7N_3O \cdot H_2O$: C, 61.4; H, 412.
Found: C, 61.3; H, 319.

p-Chlorophenylglyoxylonitrile oxime: M.P. 107–109° C.

Calculated for $C_8H_5ClN_2O \cdot 2H_2O$: C, 44.3; H, 4.2; O, 22.2.
Found: C, 44.1; H, 4.0; O, 22.1.

Phenylglyoxylonitrile oxime: M.P. 132–133° C.

Calculated for $C_8H_6N_2O$: C, 65.7; H, 4.1; O, 11.0.
Found: C, 65.5; H, 4.0; O, 11.2.

We claim:

1. A method for the preparation of an aromatic glyoxylonitrile oxime which comprises the steps of passing chlorine through a solution of an aromatic aldoxime selected from the group consisting of benzaldoxime, picolinaldehyde oxime, isonicotinaldehyde oxime, benzothiazole 2-carboxaldoxime, p-dimethylaminobenzaldoxime, 2-quinolinecarboxaldoxime, 4-quinolinecarboxaldoxime, p-chlorobenzaldoxime, 6-methylpicolinaldehyde oxime, furfuraldoxime and thiophene aldoxime in an inert oxygenated organic solvent until a precipitate no longer forms, separating said precipitate, adding a solution of alkali metal cyanide in the same inert oxygenated organic solvent to said precipitate, heating to 40–80° C. for a period of time ranging from one half to one and one half hours and recovering the corresponding said aromatic glyoxylonitrile oxime.

2. The method as set forth in claim 1 in which said aromatic aldoxime is isonicotinaldehyde oxime.

3. The method as set forth in claim 1 in which said inert oxygenated organic solvent is methanol.

4. The method as set forth in claim 1 in which said alkali metal cyanide is potassium cyanide.

5. A method for the preparation of 4-pyridineglyoxylonitrile oxime which comprises the steps of passing chlorine through a solution of isonicotinaldehyde oxime in methanol until a precipitate no longer forms, separating said precipitate, adding a solution of potassium cyanide in methanol to said precipitate, heating to 50–70° C. for approximately one hour and recovering said 4-pyridineglyoxylonitrile oxime.

No references cited.

WALTER A. MODANCE, *Primary Examiner.*

NICHOLAS S. RIZZO, *Examiner.*